United States Patent [19]

Stoffels et al.

[11] Patent Number: 4,737,215

[45] Date of Patent: Apr. 12, 1988

[54] METHOD OF MANUFACTURING A BUNDLE OF OPTICAL FIBER PARTS

[75] Inventors: Jacobus Stoffels; Adrianus P. Severijns, both of Eindhoven, Netherlands

[73] Assignee: U.S. Philips Corporation, New York, N.Y.

[21] Appl. No.: 847,989

[22] Filed: Apr. 3, 1986

[30] Foreign Application Priority Data

Apr. 9, 1985 [NL] Netherlands .................. 8501024

[51] Int. Cl.$^4$ .................................. G02B 6/04
[52] U.S. Cl. .................................. 156/166; 156/175; 156/426; 156/433; 350/96.24
[58] Field of Search .............. 350/96.24; 156/166, 156/174, 175, 161, 296, 425, 426, 433, 169; 65/4.21

[56] References Cited

U.S. PATENT DOCUMENTS

| | | | |
|---|---|---|---|
| 662,963 | 12/1900 | Preston et al. | 156/433 |
| 3,043,910 | 7/1962 | Hicks, Jr. | 350/96.27 |
| 3,193,363 | 7/1965 | Hicks, Jr. et al. | 350/96.24 |
| 3,586,562 | 6/1971 | Jones | 156/175 |
| 3,717,531 | 2/1973 | Smith | 350/96.24 |
| 3,954,546 | 5/1976 | Aurenz | 156/174 |

*Primary Examiner*—Deborah L. Kyle
*Assistant Examiner*—Michael Carone
*Attorney, Agent, or Firm*—F. Brice Faller

[57] ABSTRACT

A predetermined number of optical fibre parts (27) is provided on a rectangular frame (1), the fibre parts extending parallel to each other along a straight line between two opposite first sides (3) of the frame. These first sides (3) comprise comb-shaped fibre guides (5) with teeth (13), between which the fibre parts (27) are guided so that the fibre guides determine a first relative distance between the fibre parts. The first sides (3) are pivotably connected to the two second sides (7) of the frame (1), which is then deformed to a parallelogram until the portions of the fibre parts (27) located inside the frame have a predetermined second relative distance. A permanent connection between the fibre parts (27) is established so that a ribbon of fibre parts is obtained. A number of such ribbons can be stacked with the interposition of strip-shaped spacers (29) to form a bundle.

10 Claims, 2 Drawing Sheets

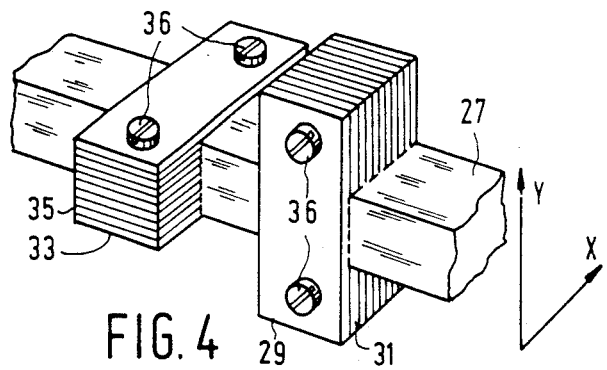
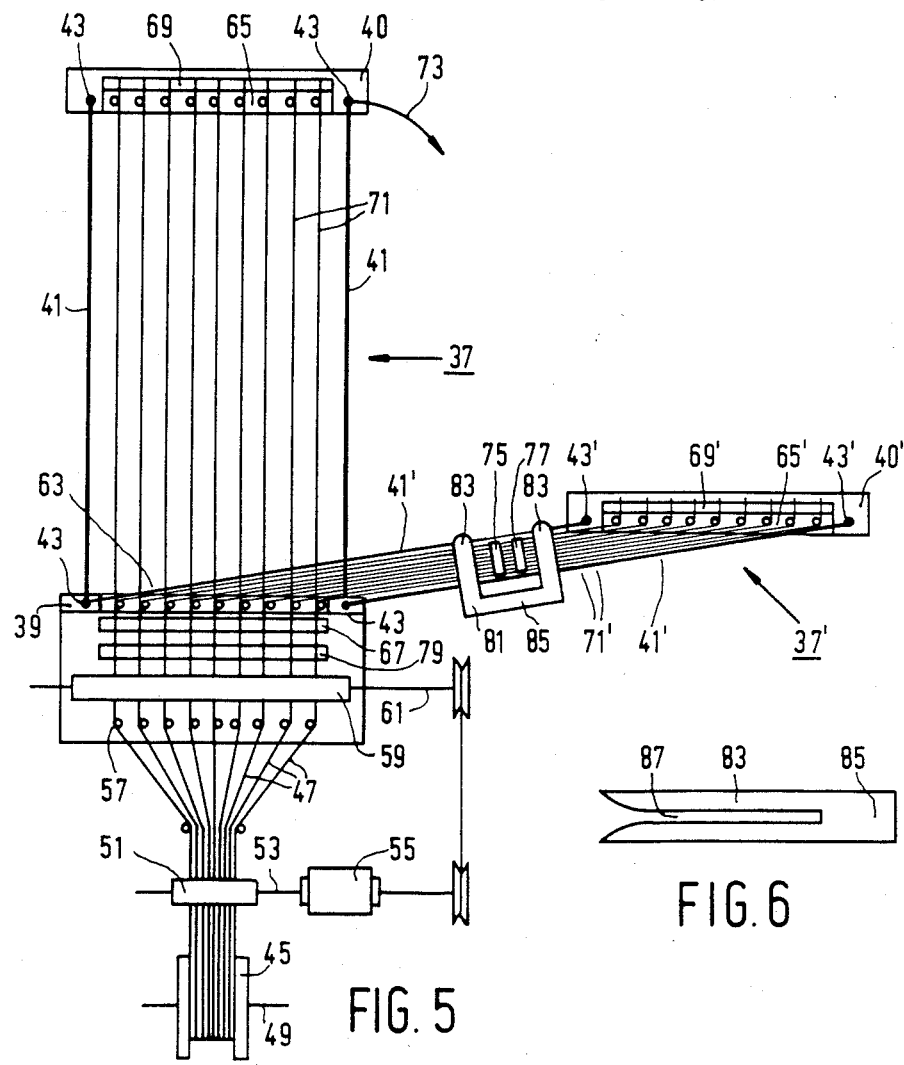

METHOD OF MANUFACTURING A BUNDLE OF OPTICAL FIBER PARTS

BACKGROUND OF THE INVENTION

The invention relates to a method of manufacturing a bundle of optical fibre parts, in which each time a number of optical fibre parts are arranged parallel to each other in the form of a ribbon and a number of such ribbons are stacked with the interposition of at least one first strip-shaped spacer between each two successive ribbons.

Such a method is known from U.S. Pat. No. 3,043,910. According to the known method, first a number of optical fibres are joined together to form a ribbon, for example by fusing the fibres together. Subsequently, the ribbons are stacked with the interposition of strip-shaped spacers. The number of stacked ribbons and the thickness of the spacers are chosen so that the thickness of the bundle formed corresponds to a first predetermined dimension. The width of the bundle is equal to the width of the ribbons, which is determined by the number and the diameter of the fibres from which these ribbons are formed. In general, this width is smaller than a desired value. Therefore, the bundle is sawn obliquely so that the width of the saw surface is equal to the desired width. Special steps are then required to ensure that the light emanates approximately at right angles to the saw surface. A second disadvantage of the known method is that the relative distance of the centres of the optical fibres in each of the ribbons depends upon the diameter of the individual fibres. If this diameter differs from fibre to fibre, the location of the fibres in the bundle can exhibit irregularities, which in many cases is not admissible. In order to avoid such irregularities, it is necessary to use optical fibres having an accurately determined outer diameter, preferably fibres made of glass. Such fibres are expensive and since a bundle generally comprises a large number of fibres, the cost price of the bundles manufactured by means of the known method in many cases is very objectionable.

SUMMARY OF THE INVENTION

According to he invention it is possible to choose the width and the thickness of the bundle so as to be highly independent of the diameter of and of the number of optical fibres over the bundle without stringent requirements being imposed on the accuracy of the diameter of the fibres.

Each ribbon is formed by providing a predetermined number of optical fibre parts on a rectangular frame, the fibre parts extending parallel to each other along a straight line between two opposite first sides of the frame, which comprise comb-shaped fibre guides having teeth between which the fibre parts are guided. The arrangement is such that the fibre guides determine a first relative distance between the fibre parts. The first sides are pivotably connected to the two second sides of the frame, which is deformed to a parallelogram until the portions of the fibre parts located within the frame have a predetermined second relative distance, after which a permanent connection between the fibre parts is established.

Before deformation of the frame, the first relative distance between the optical fibre parts is comparatively large and during deformation the second relative distance can be readily adjusted to an accurately determined value independent of small variations of the outer diameter of the fibre parts. The thickness of the bundle is mainly determined, like in the known method, by the thickness of the strip-shaped spacers arranged between the ribbons.

In a variation of the method according to the invention, the fibre parts can be very readily arranged on the frame. The fibre parts to be provided on the frame are constituted by parts of a long optical fibre, which is wound in a number of turns onto the frame by rotating the frame about an axis, extending parallel to the first sides, successive turns being located between successive pairs of teeth of the fibre guides. A "long" fibre is to be understood here and in the following description to means a fibre whose length is many times larger than the length of the bundle so that a large number of fibre parts of the bundle can be formed from a long fibre.

In a further elaboration of this variation, the ribbons can be stacked in a very simple manner. After a layer of turns has been provided, on at least one side of the plane of the frame at least one first strip-shaped spacer is arranged parallel to the plane of the frame on the fibre parts. The next layer of turns is then wound over the first spacer in the same manner as the first-mentioned layer, this procedure being repeated until a packet of fibre parts extends between each pair of used teeth of the fibre guides, the number of fibre parts of this packet being equal to the number of ribbons to be stacked.

The last-mentioned method can further be refined in that, after the desired number of layers of turns has been provided, at least one second strip-shaped spacer arranged at right angles to the plane of the frame is inserted between each frame is deformed to a parallelogram until the fibre parts touch the second strip-shaped spacers. The relative distance of the fibre parts in the ribbons is then determined by the second spacers so that measurement of this distance during deformation of the frame is not necessary.

In another variation each of the fibre parts to be provided on the frame is constituted by an end portion of a long optical fibre, these long fibres being guided from at least one supply roll via a first of the two fibre guides on one side of the plane of the frame to the second fibre guide. The fibres are then secured to a first and a second adhesive strip, which extend outside the frame parallel to the fibre guide and whose length is approximately equal to the length of the fibre guides. The frame is then deformed to a parallelogram and in a region lying between the two fibre guides a third and a foruth adhesive strip extending parallel to each other and at right angles to the longitudinal direction of the fibre parts are secured against the fibre parts. The fibre parts are then cut through between the third and the fourth adhesive strip and on the side of the first adhesive strip remote from the frame. According to this variation, the ribbons are formed in a simple manner suitable for mass production. The production speed of the ribbons can be further increased by using a further elaboration of this variation, in which a fifth adhesive strip extending parallel to the first adhesive strip is arranged on the side of the first adhesive strip remote from the frame. The fibre parts are cut through between the first and the fifth adhesive strip and the fifth adhesive strip is then moved together with the end portions of the fibres adhered thereto to the opposite side of the frame where it occupies the position of the second adhesive strip, while a new first adhesive strpip and a new fifth adhesive strip are arranged between the supply roll and the frame.

In order to guarantee that during deformation of the frame the fibre parts remain in a plane, a further elaboration of this variation is characterized in that at least at the last stage of the operation of deforming the frame to a parallelogram a U-shaped auxiliary tool having two arms each provided with a slot having a width smaller than twice the diameter of the fibres is arranged approximately halfway along the frame around the fibre parts so that the arms extend approximately at right angles to the longitudinal direction of the fibre parts and the fibre parts extend through the slots, and in that the third and fourth adhesive strips are arranged between the two arms, whereupon the auxiliary tool is removed.

BRIEF DESCRIPTION OF THE DRAWING

FIG. 4 is a perspective view of a part of a bundle of optical fibres manufactured by the method according to the invention, FIG. 5 shows a diagrammatic plan view of an embodiment of a device for carrying out a second example of the method according to the invention, and FIG. 6 is a side elevation of an auxiliary tool used in the device shown in FIG. 5.

DETAILED DESCRIPTION OF THE PREFERRED EMBODIMENT

Figure 1:
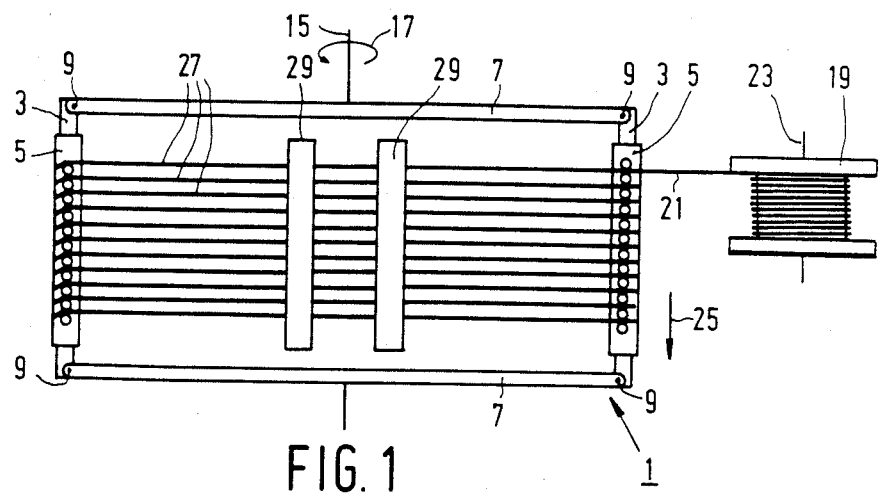
FIG. 1 is a diagrammatic plan view of a frame for illustration of a first example of the method according to the invention.
Figure 2A:
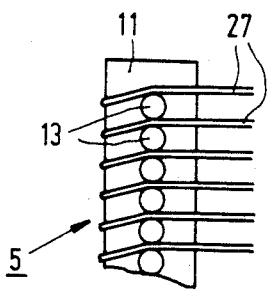
FIGS. 2A and 2B show a detail of the frame shown in FIG. 1 in plan view and in side elevation, respectively.

FIG. 1 shows a rectangular frame 1 having two opposite first sides 3, on which fibre guides 5 are arranged, and two opposite second sides 7. At the four angular points 9 of the frame 1, the first sides 3 are pivotably connected to the second sides 7. The fibre guides 5 are comb-shaped, as is clearly apparent from FIGS. 2A and 2B. They consist of an elongate support 11, in which a row of parallel teeth 13 extending at right angles to the longitudinal direction of the support is arranged. In the example shown, the teeth 13 are situated only on one side (the upper side) of the support 11. If desired, the teeth 13 may also be inserted through the support 11 so that they also project on the lower side. The frame 1 is rotatable about an axis 15 extending parallel to the first sides 3, as is indicated by the arrow 17. For that purpose the frame 1 is preferably connected to a motor (not shown).

The supply roll 19 comprises a long optical fibre 21, whose length is many times larger than the length of the second sides 7 of the frame 11. The supply roll 19 can rotate freely about a shaft 23. If it is desired to keep the fibre 21 in tension, the supply roll 19 may be slightly braked by means of a drag mechanism (not shown). An end of the fibre 21 can now be secured, for example, to the lefthand fibre guide 5 in FIG. 1 so that the fibre extends through the gap between the two lowermost teeth 13. If now the frame 1 is set into rotation in the direction of the arrow 17 and is simultaneously displaced stepwise with respect to the supply roll 19 in the direction of the arrow 25, the long fibre is wound onto the frame. The supply roll 19 then rotates about its shaft 23 so that the fibre 21 is wound off. With a suitable choice of the speed of revolution about the axis 15 in conjunction of the value and the instant of the displacement in the direction of the arrow 25, a turn of the fibre 21 is located between each pair of successive teeth 13. Each turn therefore comprises two fibre parts 27, which are located on either side of the plane of the frame 1.

Figure 2B:
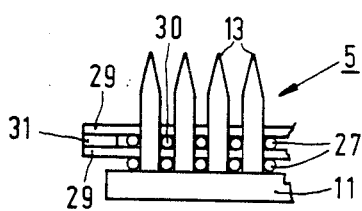

After a layer with the required number of turns has been provided, first strip-shaped spacers 29 are arranged parallel to the plane of the frame 1 on the fibre parts 27. The next layer of turns is now wound in the same manner as the first-mentioned layers over the first spacers 29. This procedure is repeated until a predetermined number of layers of turns is provided. A packet 30 of fibre parts 27 is then located between each pair of used teeth 13 of the fibre guides 5 and in this packet the number of fibre parts 27 is equal to the this number of layers of turns. In FIG. 2B, each packet 30 comprises two fibre parts 27. In practice, the number of layers of turns will generally be considerably larger, although, if desired, it is also possible to provide only one layer of turns.

Figure 3:
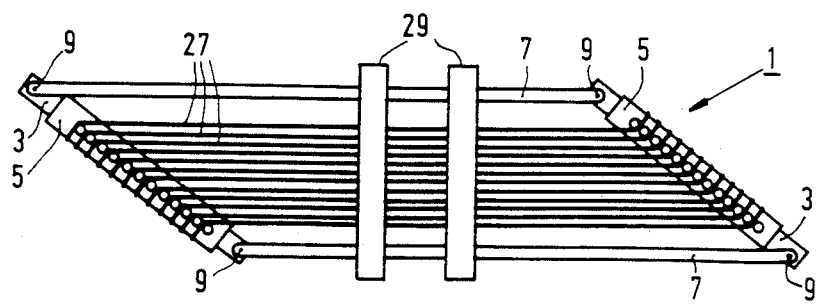
FIG. 3 shows a plan view of the frame corresponding to FIG. 1 at a later stage of the method.

The fibre 21 can now be secured to the righthand fibre guide 5 and can then be cut through between this fibre guide and the supply roll 19. The frame 1 is then deformed as shown in FIG. 3, to a parallelogram, the sides 3, 7 pivoting about the angular points 9. When the pivot points arranged at the angular points 9 are accurately in line with the rows of teeth 13, during deformation the length available for the fibre parts 27 between the fibre guides 5 remain unchanged. The relative distance of the fibre parts decreases however, and the deformation is terminated when it has reached a predetermined value. A connection between the fibre parts 27 is now established. This may be effected in different ways. For example, the two major surfaces of the first strip-shaped spacers 29 may be provided with an adhesive layer before they are arranged on the fibre parts 27. After deformation, all adhesive layers are then cured simultaneously, for example by a thermal treatment. Another method of interconnecting the fibre parts 27 consists in that the packet formed by the spacers 29 and the fibre parts 27 is clamped together, for example by boring in the end portions of the spacers projecting beyond the bundle of fibre parts a hole, in which a bolt is provided. In most cases, it is desirable to provide between these end portions of the spacers first filling strips 31 (see FIG. 2B), whose thickness is approximately equal to the diameter of the fibre 21. As a result, the spacers 29 are kept flat throughout their length.

After the fibre parts 27 have been interconnected they are cut through and removed from the frame 1, a bundle of fibre parts being formed which consists of a number of ribbons of parallel fibre parts which are stacked with the interposition of the first strip-shaped spacers 29 and which occupy corresponding positions at the input and output sides of the bundle. Such bundles are suitable, for example, for image transmission. The number of ribbons is equal to the number of layers of turns that was provided on the frame 1. The number of bundles thus formed depends upon the number of times the fibre parts 27 are cut through. It is possible to provide a comparatively large number of spacers 29 on both sides of the plane of the frame and to cut through the fibre parts between each pair of adjacent spacers. In this case, a comparatively large number of short bundles is formed. It is also possible to provide per layer of turns only one first strip-shaped spacer 29 on one side of the plane of the frame 1 and to cut through these fibre parts 27 in the proximity of these spacers. A single comparatively long bundle of fibre parts 27 is then obtained.

It has been explained above that the deformation of the frame 1 to a parallelogram is terminated when the relative distance of the fibre parts 27 has reached a predetermined value. For this purpose, this distance can be constantly measured during deformation, for example by means of a measuring microscope. However, a simpler method consists in that, after the required number of turns has been provided, one or more second strip-shaped spacers are provided, which are at right angles to the plane of the frame 1. One or more second strip-spaced spacers are inserted between each pair of adjacent packets 30, after which the frame 1 is deformed until the fibre parts 27 in the packets 30 touch the second strip-shaped spacers. These second strip-shaped spacers may be used in the same manner as the first strip-shaped spacers 29 for interconnecting the fibre parts 27. In FIG. 4, a part of bundle of fibre parts 27 thus formed is shown in perspective view. In this Figure, the first strip-shaped spacers 29 with the first filling strips 31 are shown at a certain distance from the second spacers 33 with second filling strips 35. In practice, this distance will be kept as small as possible, preferably less than 1 mm, so that the position of the fibre parts 27 in the X and Y directions indicated in FIG. 4 is accurately determined. The fibres used may be, for example, fibres of synthetic material having an outer diameter of 135 $\mu$m and a core diameter of 125 $\mu$m. The first and second strip-shaped spacers may be formed, for example, from steel foil having a thickness of 25 $\mu$m. No stringent requirements are imposed on the accuracy of the outer diameter of the fibres. Too thick fibres are slightly flattened and too thin fibres have a relative space of a few microns. When the distance between the centre lines of the teeth 13 is about 1 mm, the second strip-shaped spacers can be inserted without difficulty between the packets 30. In the embodment shown in FIG. 4, the packets formed by the spacers 29 and 33, respectively, the filling strips 31 and 35, respectively, and the fibre parts 27 are clamped together by means of bolts 36. The bundle is preferably cut through in the region between the first and second spacers. In this region, the degree of orderliness of the fibres is optimum.

The device shown in FIG. 5 comprises a rectangular frame 37 having first sides 39 and 40, second sides 41 and pivotable angular points 43 analogous to the frame 1 shown in FIG. 1. A supply roll 45, in this embodiment a warp thread, as used in looms, comprises a large number of long optical fibres 47 wound beside each other. Instead of the warp thread 45, a large number of separate supply rolls each with a single long optical fibre may be used. The supply roll 45 is freely rotatable about a shaft 49. The fibres 47 can be pulled off the supply roll 45 by a first transport roller 51, which is rotatable about a shaft 53 and is driven by a motor 55. The fibres 47 are then guided through a guide system 47 to a second transport roller 59 having a shaft 61, which is likewise driven by the motor 55. The guide system 57 may comprise in the same manner as the fibre guides 5 of the device shown in FIG. 1 a row of teeth, between which the fibres 47 are guided. The fibres 47 are now guided via the closest first side 39 of the frame 37 on one side of the plane of the frame to the remotest first side 40. On the first side 39 is disposed a first fibre guide 63, whose construction corresponds to that of the fibre guides 5 described with reference to FIGS. 1 and 2. On the first side 40 is disposed a second fibre guide 65, which is constructed in the same manner. The distance between the centres of the teeth of the guide system 57 and of the fibre guides 63, 65 is chosen so that the fibres 47 extend along a substantially straight line from the gudie system to the second fibre guide. A first and a second adhesive strip 67 and 69, respectively, are situated parallel to the first and second fibre guide 63 and 65, respectively, and just outside the frame 37. The adhesive strips 67, 69 are provided, for example, with an adhesive layer on which the fibres 47 are secured. However, the fibres may also be secured to the adhesive strips in a different way, for example by heating. The length of the adhesive strips 67, 69 is approximately equal to the length of the fibre guides 63, 65.

When the end portions 71 of the fibres 47 are secured to the adhesive strips 67, 69, the frame 37 is deformed to a parallelogram in the same manner as described for the frame 1. This is indicated by the arrow 73. The new position of the frame 37 is indicated by 37' and the reference numerals of the remaining components occupying a new position are also provided with an accent. The first side 39 of the frame 37 with the components provided thereon does not change its place.

The frame 37 is deformed to such an extent that the relative distance of the fibre parts 71' located between the fibre guides 63, 65' is equal to a predetermined value. About halfway between the two fibre guides 63, 65', a third and a fourth adhesive strip 75 and 77, respectively, are secured to the fibre parts 71'. The last-mentioned adhesive strips are parallel to each other and extend at right angles to the longitudinal direction of the fibre parts 71'. The fibre parts 71' are not cut through between the third and the fourth adhesive strips 75 and 77, respectively, and on the side of the first adhesive strip 67 remote from the frame 37' and are removed together with the adhesive strips from the frame 37'. Thus, two ribbons of fibre parts 71' extending parallel beside each other are formed, the relative distance of the fibre parts at one end (near the adhesive strips 75 and 77, respectively) being smaller than that of the other end (near the adhesive strips 67 and 69', respectively). A number of such ribbons can be stacked again to a bundle with the interposition of strip-shaped spacers. When the adhesive strips are suitably chosen, they may serve at the same time as spacers. Of course, it is alternatively possible to provide between the two fibre guides 67 and 69' more than two third and fourth adhesive strips and to cut through the fibre parts 71' between each two successive third and fourth adhesive strips, as a result of which a number of shorter ribbons having a constant width are formed.

Preferably, there is situated on the side of the first adhesive strip 67 remote from the frame 37 (between this first adhesive strip and the second driving roller 59) a fifth adhesive strip 79, which extends parallel to the first adhesive strip 67 and to which the fibre parts 71 are also adhered. The fibre parts 71 are then cut through after deformation of the frame 37' between the first adhesive strip 67 and the fifth adhesive strip 79. Subsequently, the frame 37' is returned to its original position denoted by 37, after which the new end portions of the fibres 47 are moved together with the fifth adhesive strip 79 adhered thereto to the opposite side of the frame. The fifth adhesive strip 79 then occupies the position of the second adhesive strip 69 and a new first adhesive strip and a new fifth adhesive strip are provided and connected to the fibres 47 on the side of the frame 37 facing the supply roll 45. The ribbons can thus be manufactured very rapidly so that the method is suitable for mass production.

During the operation of deforming the frame 37 to a parallelogram, there is a risk of fibre parts 71 being located over each other, especially when the ultimate relative distance of these fibre parts is chosen to be very small. In order to avoid this risk, use may advantageously be made of an auxiliary tool in the form of a U having two parallel arms 83 interconnected by a base portion 85 (see also FIG. 6). Each arm 83 comprises a slot 87, whose width is smaller than twice the diameter of the fibres 47. The auxiliary tool 81 is arranged in such a manner around the fibre parts 71' that the arms 83 are approximately at right angles to the longitudinal direction of these fibre parts and the fibre parts extend through the slots 87. Due to the small slot width, the fibre parts are then not located over each other. Of course the auxiliary tool 81 need be provided only when the distance between the fibre parts 71' is very small, i.e. at the last stage of the deformation of the frame 37. After the deformation has been entirely terminated, the third adhesive strip 75 and the fourth adhesive strip 77 are arranged between the two arms 83 after which the auxiliary tool 81 can be removed.

What is claimed is:

1. A method of manufacturing a bundle of optical fibre parts, in which each time a number of optical fibre parts are arranged parallel to each other in the form of a ribbon and a number of such ribbons are stacked with the interposition of at least one first strip-shaped spacer between each two successive ribbons, characterized in that each ribbon is formed by providing a predetermined number of optical fibre parts of a rectangular frame, the fibre parts extending parallel to each other along a straight line between two opposite first sides of the frame, which comprise comb-shaped fibre guides having teeth, between which the fibre parts are guided, the arrangement being such that the fibre guides determine a first relative distance between the fibre parts, which first sides are pivotably connected to two second sides of the frame, this frame then being deformed to a parallelogram until the portions of the fibre parts located within the frame has a predetermined second relative distance, after which a permanent connection between the fibre parts is established.

2. A method as claimed in claim 1, characterized in that the fibre parts to be provided on the frame are constituted by parts of a long optical fibre, which is wound in a number of turns onto the frame by rotating the frame about an axis extending parallel to the first sides, successive turns being located between successive pairs of teeth of the fibre guides.

3. A method as claimed in claim 2, characterized in that, after a layer of turns has been provided, on at least one side of the plane of the frame, said least one first strip-shaped spacer is arranged parallel to the plane of the frame on the fibre parts, after which the next layer of turns is wound over the first spacer in the same manner as the first-mentioned layer, this procedure being repeated until a packet of fibre parts extends between each pair of used teeth of the fibre guides, the number of fibre parts of this packet being equal to the number of ribbons to be stacked.

4. A method as claimed in claim 3, characterized in that, after the desired number of turns has been provided, said least one second strip-shaped spacer arranged at right angles to the plane of the frame is inserted between each pair of adjacent packets of fibre parts, after which the frame is deformed to a parallelogram until the fibre parts touch the second strip-shaped spacers.

5. A method as claimed in claim 4, characterized in that two major surfaces of the strip-shaped spacers are provided with an adhesive layer before they are arranged on the fibre parts and in that, after the frame has been deformed to a parallelogram, all the adhesive layers are cured simultaneously.

6. A method as claimed in claim 3, characterized in that the two major surfaces of the strip-shaped spacers are provided with an adhesive layer before they are arranged on the fiber parts and in that, after the frame has been deformed to a parallelogram, all the adhesive layers are cured simultaneously.

7. A method as claimed in claim 1, characterized in that each of the fibre parts to be provided on the frame is constituted by an end portion of along optical fibre, these long fibres being guided from at least one supply roll via a first of two fibre guides on one side of the plane of the frame to the second fibre guide, after which the fibres are secured to a first and a second adhesive strip, which extend outside the frame parallel to the fibre guides and whose length is approximately equal to the length of the fibre guides whereupon the frame is deformed to a parallelogram and in a region lying between the two fibre guides a third and a fourth adhesive strip extending parallel to each other and at right angles to the longitudinal direction of the fibre parts are secured against the fibre parts, after which the fibre parts are cut through between the third and the fourth adhesive strip and on the side of the first adhesive strip remote from the frame.

8. A method as claimed in claim 7, characterized in that a fifth adhesive strip extending parallel to the first adhesive strip is arranged on the side of the first adhesive strip remote from the frame, in that the fibre parts are cut through between the first and the fifth adhesive strip and in that after the cutting operation the fifth adhesive strip is moved together with the end portions of the fibres adhered thereto to the opposite side of the frame and occupies the position of the second adhesive strip, while a new first adhesive strip and a new fifth adhesive strip are arranged between the supply roll and the frame.

9. A method of as claimed in claim 8, characterized in that at least at the last stage of the operation of deforming the frame to a parallelogram a U-shaped auxiliary tool having two arms each provided with a gap having a width smaller than twice the diameter of the fibres is arranged approximately halfway along the frame in such a manner around the fibre parts that the arms extend approximately at right angles to the longitudinal direction of the fibre parts and the fibre parts extend through the slots, and in that the third and fourth adhesive strips are arranged between the two arms, whereupon the auxiliary tool is removed.

10. A method as claimed in claim 7, characterized in that at least at the last stage of the operation of deforming the frame to a parallelogram a U-shaped auxiliary tool having two arms each provided with a gap having a width smaller than twice the diameter of the fibers is arranged approximately halfway a long the frame in such a manner around the fiber parts that the arms extend approximately at right angles to the longitudinal direction of the fiber parts and the fiber parts extend through the slots, and in that the third and fourth adhesive strips are arranged between the two arms, whereupon the auxiliary tool is removed.

* * * * *